United States Patent
Snyder et al.

(10) Patent No.: US 6,996,727 B1
(45) Date of Patent: Feb. 7, 2006

(54) POWER SUPPLY FOR UNIVERSAL SERIAL BUS INTERFACE WITH PROGRAMMABLE BUS PULLUP RESISTOR

(75) Inventors: Warren S. Snyder, Snohomish, WA (US); Louis Cambre, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 594 days.

(21) Appl. No.: 09/649,551

(22) Filed: Aug. 28, 2000

(51) Int. Cl.
*G06F 1/26* (2006.01)
(52) U.S. Cl. .................................. 713/300; 713/320
(58) Field of Classification Search ............... 713/300, 713/320
See application file for complete search history.

(56) References Cited

U.S. PATENT DOCUMENTS

| | | | | |
|---|---|---|---|---|
| 5,384,721 A | * | 1/1995 | Joto | 713/321 |
| 5,471,625 A | * | 11/1995 | Mussemann et al. | 713/322 |
| 5,737,616 A | * | 4/1998 | Watanabe | 713/340 |
| 5,767,844 A | * | 6/1998 | Stoye | 345/212 |
| 5,862,349 A | * | 1/1999 | Cho et al. | 710/304 |
| 5,959,926 A | * | 9/1999 | Jones et al. | 365/226 |
| 6,148,345 A | * | 11/2000 | Yamaki | 709/253 |
| 6,279,060 B1 | * | 8/2001 | Luke et al. | 710/64 |
| 6,363,491 B1 | * | 3/2002 | Endo | 713/310 |
| 6,460,143 B1 | * | 10/2002 | Howard et al. | 713/323 |
| 6,711,691 B1 | * | 3/2004 | Howard et al. | 713/300 |

FOREIGN PATENT DOCUMENTS

JP     2000232452 A   *   8/2000

OTHER PUBLICATIONS

"Method to Provide Low Power Standby Mode for Online Devices". (1987). IBM Technical Disclosure Bulletin. vol.29, Issue 11. pp. 4463.*

* cited by examiner

*Primary Examiner*—Lynne H. Browne
*Assistant Examiner*—Eric Chang
(74) *Attorney, Agent, or Firm*—Christopher P. Maiorana, PC

(57) ABSTRACT

An apparatus comprising a power supply device configured to generate a voltage. The voltage may comprise either (i) a standard voltage level or (ii) a power down voltage level. The power down voltage level may be configured to reduce current consumption.

19 Claims, 3 Drawing Sheets

US 6,996,727 B1

POWER SUPPLY FOR UNIVERSAL SERIAL BUS INTERFACE WITH PROGRAMMABLE BUS PULLUP RESISTOR

FIELD OF THE INVENTION

The present invention relates to a method and/or architecture for implementing a power supply generally and, more particularly, to a method and/or architecture for implementing a 3V power supply for a Universal Serial Bus (USB) interface.

BACKGROUND OF THE INVENTION

Referring to FIG. 1, a block diagram of a circuit 10 is shown illustrating a conventional power supply implemented in a Universal Serial Bus (USB) environment (such as a device in compliance with the Universal Serial Bus Specification, Version 1.1, published September 1998 and the Universal Serial Bus Specification, Version 2.0, published April 2000, both of which are incorporated by reference). The circuit 10 comprises a power supply portion 12, a USB input/output (USB I/O) 14 and a bus portion 16. The power supply portion 12 and the USB I/O portion 14 are implemented on a single device. The power supply 12 presents a constant 3.3V power supply to the USB I/O 14. The power supply 12 does not provide a low power standby mode. The bus portion 16 comprises a resistor R1, a resistor R2 and a resistor R3. The resistor R1 is implemented as a 7.5KΩ resistor. The resistor R2 is implemented as a 15KΩ resistor. The resistor R3 is implemented as a 15KΩ resistor.

A source of the resistor R1 receives a voltage signal VBUS. The voltage signal VBUS is a 5V nominal supply voltage. The drain of the resistor R1 is coupled to a node D+. A source of the resistor R2 is coupled to the node D+. A drain of the resistor R2 is coupled to ground. A source of the resistor R3 is coupled to a node D−. A drain of the resistor R3 is coupled to ground. Additionally, the USB I/O portion 14 is coupled to the node D+ and the node D−. The USB I/O 14 is configured to communicate with the bus portion 16. The USB I/O 14 and the bus portion 16 are not configured to operate in a low power standby mode.

SUMMARY OF THE INVENTION

The present invention concerns an apparatus comprising a power supply device configured to generate a voltage. The voltage may comprise either (i) a standard voltage level or (ii) a power down voltage level. The power down voltage level may be configured to reduce current consumption.

The objects, features and advantages of the present invention include providing a method and/or architecture for a power supply for a Universal Serial Bus (USB) interface that may (i) allow a USB interface and bus pullup resistor to be powered by a power supply which regulates a supply voltage between 3V and 3.6V, while in a standard mode of operation, (ii) allow the power supply to be shut off, forcing power consumption to be severely reduced while in a power down (e.g., standby) mode of operation, (iii) allow a programmable pullup resistor to provide current for a bus pullup resistor, (iv) implement an on chip USB power supply with a power down (standby) mode that may have reduced current consumption, and/or (v) provide compensation for process variations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
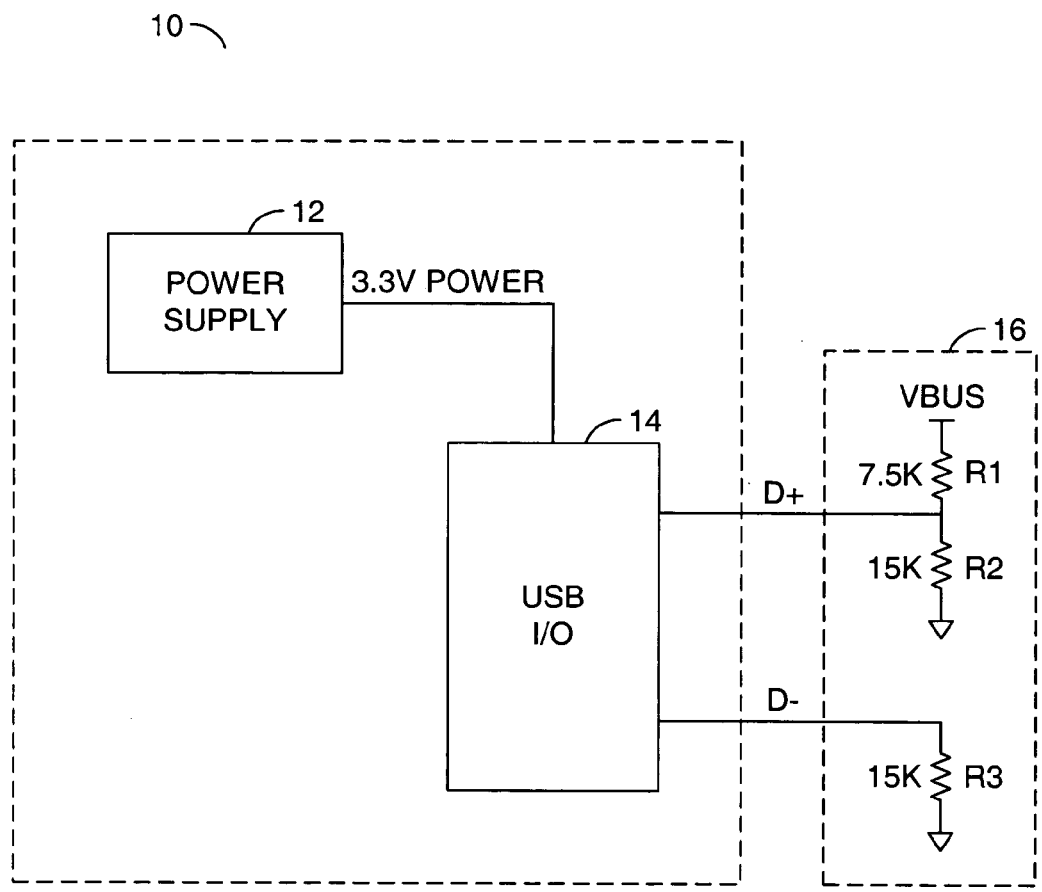
FIG. 1 is a block diagram of a conventional architecture for an internal power supply for a Universal Serial Bus (USB) interface.
Figure 2:
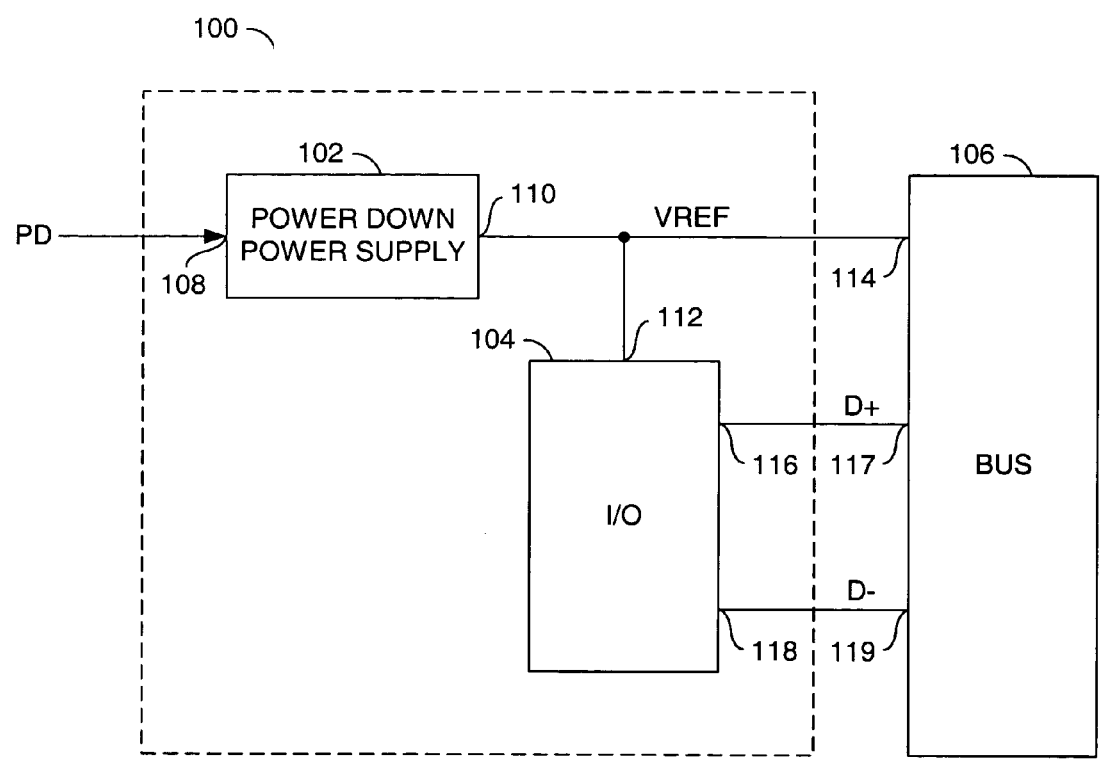
FIG. 2 is a block diagram of a preferred embodiment of the present invention.

Referring to FIG. 2, a block diagram of a circuit 100 is shown in accordance with a preferred embodiment of the present invention. In one example, the circuit 100 may be implemented as a 3V power supply for a Universal Serial Bus (USB) interface. The structure of the circuit 100 generally comprises a power down supply block (or circuit) 102 and an I/O portion (or circuit) 104. The I/O portion 104 may be implemented, in one example, as a USB I/O device. In another example, the power down supply 102 and the I/O portion 104 may be implemented on a single device. Additionally, the circuit 100 may be connected to a bus portion 106.

The circuit 100 may allow the I/O portion 104 and a bus pullup resistor (to be discussed in connection with FIG. 3) to be powered by a power supply that may regulate a supply voltage between 3V and 3.6V, while in a standard mode of operation. Additionally, the circuit 100 may allow the power supply to be shut off, generally forcing power consumption of the I/O portion 104 and the bus portion 106 to be severely reduced, while in a power down (e.g., standby) mode of operation. The power down (standby) mode may allow the circuit 100 to have reduced current consumption. The circuit 100 may also provide compensation for process variations (to be discussed in connection with FIG. 3).

The power down supply 102 may have an input 108 that may receive a signal (e.g., PD). In one example, the signal PD may be implemented as a power down indication signal. However, the signal PD may be implemented as another appropriate type signal in order to meet the criteria of a particular implementation. The signal PD may control a mode of operation of the circuit (e.g., standard or power down mode). The power down supply 102 may also have an output 110 that may present a signal (e.g., VREF). The power down supply 102 may generate the signal VREF in response to the signal PD. The signal VREF may be implemented, in one example, as a variable supply voltage signal. However, the signal VREF may be implemented as a voltage on a node, a voltage level or other appropriate type signal in order to meet the criteria of a particular implementation. The signal VREF may be presented to an input 112 of the I/O portion 104 as well as to an input 114 of the bus portion 106.

The I/O portion 104 may have an input/output 116 that may be connected to a node (e.g., D+) and an input/output 118 that may be connected to a node (e.g., D−). The node D+ may be connected to an input/output 117 of the bus portion 106 and the node D− may be connected to an input/output 119 of the bus portion 106. The node D+ and the node D− may each be implemented as a voltage on a node, a voltage level or other appropriate type signal in order to meet the criteria of a particular implementation.

Figure 3:
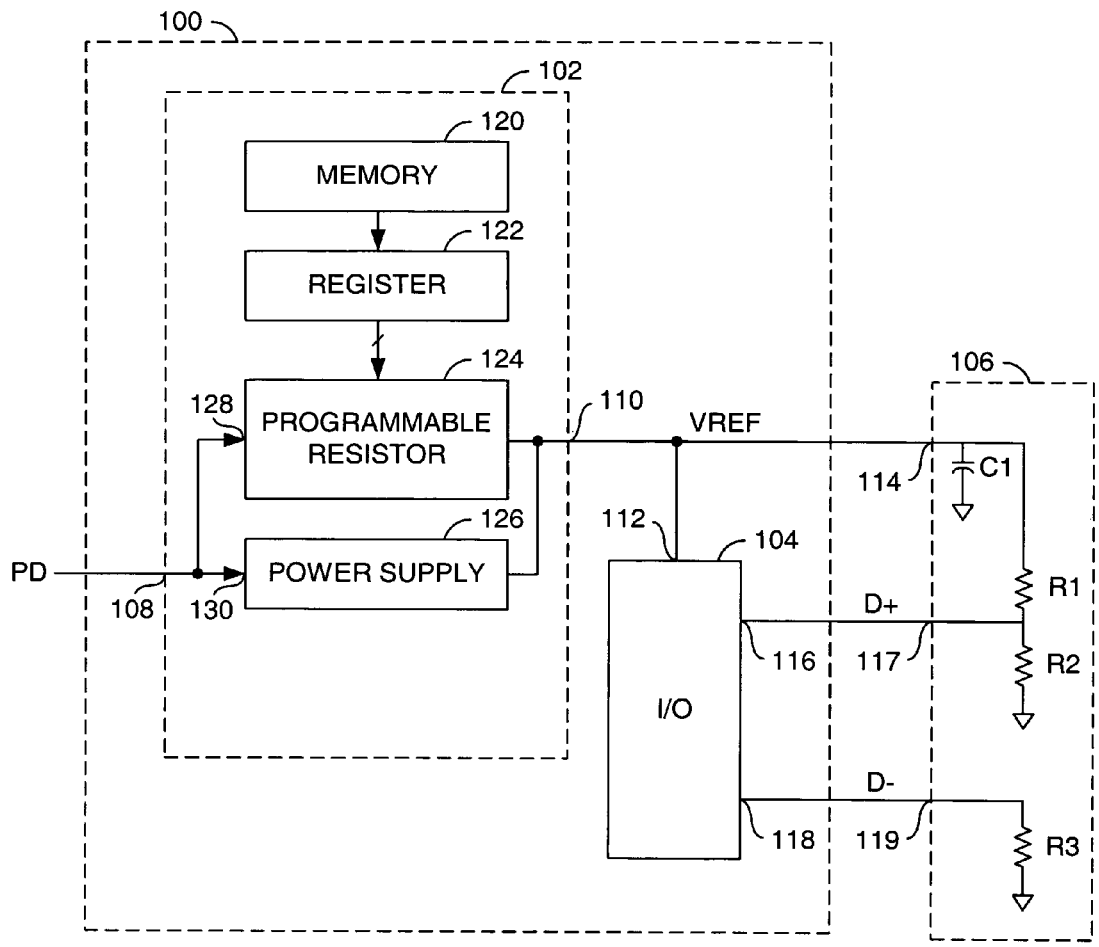
FIG. 3 is a detailed block diagram of the present invention.

Referring to FIG. 3, a detailed block diagram of the circuit 100 is shown. The circuit 102 generally comprises a memory 120, a register 122, a programmable resistor 124 and a power supply 126. In one example, the memory 120 may be implemented as a nonvolatile memory, the register 122 may be implemented as a trim bit register and the programmable resistor 124 may be implemented as a programmable pullup resistor. The memory 120 may be configured to present a signal (or data) to the register 122. The register 122 may be configured to store the data and present a signal to the programmable resistor 124. The memory 120 may download data to the programmable resistor 124 via the register 122. The memory 120 may be programmed (or loaded) at an initialization (or test) state. The programmable resistor 124 may be implemented to compensate for process variations. The memory 120 may provide trim bits that may allow the programmable resistor 124 to adjust an internal variable resistance.

The programmable resistor 124 may have an input 128 that may receive the signal PD and the power supply 126 may have an input 130 that may receive the signal PD. The signal PD may control the power supply 126 and the programmable resistor 124. For example, when the signal PD is active high, the power supply 126 may be non-active and the programmable resistor 124 may be active. However, a particular active/non-active state of the signal PD, the programmable resistor 124 and/or the power supply 126 may be varied in order to meet the criteria of a particular implementation. Additionally, the signal PD may control a mode of operation of the circuit 100. For example, the signal PD may indicate a power down mode of operation or a standard mode of operation.

The bus portion 106 may comprise a capacitor C1, a resistor R1, a resistor R2 and a resistor R3. In one example, the resistor R1 may be implemented as a bus pullup resistor. The I/O portion 104 is generally coupled to the node D+ (e.g., the connection 117) and the node D− (e.g., the connection 117). A first side of the capacitor C1 may be coupled to the node VREF. A second side of the capacitor C2 may be coupled to ground. A source of the resistor R1 may be coupled to the node VREF. A drain of the resistor R1 may be coupled to the node D+. A source of the resistor R2 may be coupled to the node D+. A drain of the resistor R2 may be coupled to ground. A source of the resistor R3 may be coupled to the node D−. A drain of the resistor R3 may be coupled to ground. In one example, the resistor R1 may be implemented having a resistance of 7.5KΩ, the resistor R2 may be implemented having a resistance of 15KΩ and the resistor R3 may be implemented having a resistance of 15KΩ. However, other particular resistor values may be implemented accordingly to meet the design criteria of a particular implementation.

The power down supply 102 may power the I/O circuit 104 and the external bus pullup resistor R1 in a normal mode of operation. However, the circuit 100 may allow the bus pullup resistor R1 to remain pulled up while the power down supply 102 is in a low power mode. Additionally, the bus pullup resistor R1 may be internally compensated for or even eliminated through programmable logic.

The power supply 126 may turn on when a power down mode is non-active (e.g., a predetermined state of the signal PD). The power supply 126 may turn off when the power down mode is active (e.g., a predetermined state of the signal PD). Additionally, the programmable resistor 124 may be configured to turn on when the power supply 126 turns off and configured to turn off when the power supply 126 turns on. The power supply 126 and the programmable resistor 124 may be configured in response to the signal PD. The circuit 100 may illustrate a two state operation (e.g., standard mode and power down mode). However, other appropriate modes, states and/or implementations (via the signal PD or other appropriate signal (s)) may be implemented in order to meet the criteria of a particular implementation. For example, the circuit 100 may enter a sleep mode, a suspend mode, a high speed mode, a normal speed mode, etc.

In the standard mode of operation the I/O circuit 106 and the pullup resistor R1 are generally powered by the power supply 126 which may regulate the voltage VREF (e.g., between 3V and 3.6V). In the power down mode of operation the power supply 126 is generally shut off. Thus, power consumption of the power supply 126 may drop to nearly zero. During the power down mode the programmable resistor 124 may be enabled to provide current for the bus pullup resistor R1. However, the programmable resistor 124 is generally programmed by the memory 120 (via the register 122) and controlled by the signal PD. Trim bit instructions (data) in the register 122 are generally loaded from the memory 120. The memory 120 is generally programmed (or loaded) when initiated (or tested) The memory 120, the register 122 and the programmable resistor 124 may be implemented to compensate for process variations of the bus pullup resistor R1. However, the programmable resistor 124 may be configured to compensate for other process variations in order to meet the criteria of a particular implementation.

The circuit 100 may allow the bus pullup resistor R1 to be tied to an approximate 3.3V internal power supply when in a standard mode of operation. Additionally, the circuit 100 may have a standby mode that may limit current consumption. The circuit 100 may be implemented as an adjustable on chip USB power supply. The circuit 100 may limit current consumption of the I/O portion 104 and the bus portion 106. The circuit 100 may limit current consumption via the programmable pullup resistor 124 and the power supply 126. Adjustments to compensate for process variation of the bus pullup resistor R1 may be accomplished via trim bits programmed into the memory 120.

The circuit 100 may allow the I/O portion 104 and the bus pullup resistor R1 to be powered by a power supply that may regulate a supply voltage between 3V and 3.6V, while in a standard mode of operation. Additionally, the circuit 100 may allow the power supply to be shut off, forcing power consumption to be severely reduced, while in a power down (standby) mode of operation. The circuit 100 may allow the programmable pullup resistor 124 to provide an appropriate current for the bus pullup resistor R1. The circuit 100 may implement an on chip USB power supply with power down (standby) mode that may have reduced current consumption. The circuit 100 may provide compensation for process variations.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a power supply device configured to generate a voltage, wherein said voltage comprises either (i) a standard voltage level when in a first mode and (ii) a power down voltage level when in a second mode, wherein (i) said power down voltage level is configured to reduce current consumption, (ii) a programmable resistor pulls up a bus pullup resistor on a bus external to said power supply device when in said second mode and (iii) said programmable resistor is controlled by a register loaded from a nonvolatile memory.

2. The apparatus according to claim 1, wherein said power supply device is configured to power an interface.

3. The apparatus according to claim 2, wherein said interface comprises a Universal Serial Bus interface.

4. The apparatus according to claim 1, wherein said power supply device is configured in response to an indication signal.

5. The apparatus according to claim 4, wherein said indication signal comprises a power down indication signal.

6. The apparatus according to claim 4, wherein said indication signal indicates said first mode of operation or said second mode of operation.

7. The apparatus according to claim 6, wherein said first mode of operation comprises a standard mode and said second mode of operation comprises a power down mode.

8. The apparatus according to claim 1, further comprising an interface and a bus configured to receive said voltage.

9. The apparatus according to claim 1, wherein said power supply device comprises:
a power supply, wherein said programmable resistor and said power supply are configured to generate said voltage.

10. The apparatus according to claim 9, wherein said register comprises a trimbits register and said programmable resistor comprises a programmable pullup resistor.

11. The apparatus according to claim 9, wherein said programmable resistor and said power supply are configured in response to a power down indication signal.

12. The apparatus according to claim 1, wherein said programmable resistor is configured to provide compensation for process variations.

13. The apparatus according to claim 1, wherein said power supply device comprises an on chip USB power supply.

14. The apparatus according to claim 1, wherein said power supply device is further configured to allow a supply voltage to be turned off.

15. The apparatus according to claim 1, wherein said pullup resistor is implemented within a bus portion.

16. The apparatus according to claim 15, wherein said bus portion is configured to receive said voltage.

17. An apparatus comprising:
means for generating a voltage; and
means for (i) reducing current consumption in a first mode when said voltage comprises a power down voltage level and (ii) not reducing current consumption in a second mode when said voltage comprises a standard voltage level, wherein (i) programmable resistor pulls up a pullup resistor on a bus external to said voltage generating means when in said first mode and (ii) said programmable resistor is controlled by a register loaded from a nonvolatile memory.

18. A method for supplying a voltage level comprising the steps of:
(A) generating a voltage;
(B) reducing current consumption in a first mode when said voltage comprises a power down voltage level;
(C) not reducing current consumption in a second mode when said voltage comprises a standard voltage level; and
(D) pulling up a pullup resistor on a bus external to said power supply device using and a programmable resistor when in said first mode and said programmable resistor is controlled by a register loaded from a nonvolatile memory.

19. A power supply comprising:
a primary power supply configured to generate either (i) a standard voltage level on a supply line when in a first mode and (ii) a power down voltage level on said supply line when in a second mode, wherein (i) said power down voltage level is configured to reduce current consumption; and
a secondary power supply comprising a programmable resistor, a register and a nonvolatile memory, wherein (i) said secondary power supply powers an external bus through said supply line when said primary power supply is in said second mode and (ii) said programmable resistor is controlled by a register loaded from a nonvolatile memory.

* * * * *